United States Patent
Domroese et al.

(10) Patent No.: US 7,387,391 B2
(45) Date of Patent: Jun. 17, 2008

(54) APPARATUS AND METHOD FOR MOUNTING IMAGERS ON STRESS-SENSITIVE POLARIZING BEAM SPLITTERS

(75) Inventors: Michael K. Domroese, Woodbury, MN (US); Michael P. Keyes, Minneapolis, MN (US); Jiaying Ma, Maplewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 215 days.

(21) Appl. No.: 11/133,764

(22) Filed: May 20, 2005

(65) Prior Publication Data

US 2006/0262275 A1 Nov. 23, 2006

(51) Int. Cl.
G03B 21/28 (2006.01)
G03B 21/26 (2006.01)
G02F 1/1335 (2006.01)
G02B 5/04 (2006.01)
G02B 5/30 (2006.01)
G02B 27/14 (2006.01)
G02B 27/12 (2006.01)
H04N 5/74 (2006.01)

(52) U.S. Cl. .............................. 353/33; 353/20; 353/34; 353/81; 353/82; 349/9; 359/496; 359/638; 359/640; 359/833; 359/837; 348/750; 348/757; 348/758

(58) Field of Classification Search .................... 353/33, 353/20, 34, 37, 81, 82, 98, 99, 119, 122; 349/5, 7, 8, 9; 359/483, 487, 495, 496, 618, 359/629, 638, 640, 831, 833, 837; 348/750, 348/757–759
See application file for complete search history.

(56) References Cited

U.S. PATENT DOCUMENTS

| 5,579,138 | A | 11/1996 | Sannohe et al. |
| 6,588,905 | B2 | 7/2003 | Sekine |
| 6,672,721 | B2 | 1/2004 | Aastuen et al. |
| 6,709,110 | B2 | 3/2004 | Domroese et al. |

(Continued)

FOREIGN PATENT DOCUMENTS

JP 2000-321480 11/2000

(Continued)

OTHER PUBLICATIONS

U.S. Appl. No. 11/088,153, filed Mar. 23, 2005, and entitled Stress Birefringence Compensation In Polarizing Beamsplitters and Systems Using Same.

(Continued)

*Primary Examiner*—Rochelle-Ann Blackman

(57) ABSTRACT

An optical device that includes an optical element, an imager, and a prism bracket. The optical element includes an optical element having first and second prisms coupled together. The imager is arranged adjacent to the first prism and configured to receive light from or to transmit light to the optical element, wherein the first prism is spaced between the second prism and the first imager. The prism bracket is coupled between the second prism and the first imager to hold the first imager in a desired positional alignment relative to the optical element. The optical device may further include additional sets of an optical element, imager, and prism bracket, wherein all of the sets are coupled to a color light combiner.

16 Claims, 7 Drawing Sheets

U.S. PATENT DOCUMENTS

| | | | |
|---|---|---|---|
| 6,786,604 | B2 | 9/2004 | Aastuen et al. |
| 6,834,964 | B2 * | 12/2004 | Nishihara et al. ............. 353/52 |
| 6,844,993 | B2 | 1/2005 | Fujimori et al. |
| 7,147,333 | B2 * | 12/2006 | Shirota ........................ 353/81 |
| 2003/0058537 | A1 * | 3/2003 | Domroese et al. ........... 359/495 |
| 2003/0071975 | A1 | 4/2003 | Fujimori et al. |
| 2003/0147157 | A1 * | 8/2003 | Kamimura et al. .......... 359/831 |
| 2004/0227898 | A1 | 11/2004 | Ma et al. |
| 2005/0128438 | A1 * | 6/2005 | Kang et al. ................... 353/69 |

FOREIGN PATENT DOCUMENTS

| | | |
|---|---|---|
| JP | 2004-310823 | 11/2000 |
| JP | 2001-350071 | 12/2001 |
| JP | 2002-048960 | 2/2002 |
| JP | 2003-156607 | 5/2003 |

OTHER PUBLICATIONS

U.S. Appl. No. 10/914,596, filed Aug. 9, 2004, and entitled Projection Display System Using Multiple Light Sources and Polarizing Element for Using With Same.

Cline et al. (Thermal stress birefringence in LCOS projection displays, Display 23 (2002) pp. 151-159).

* cited by examiner

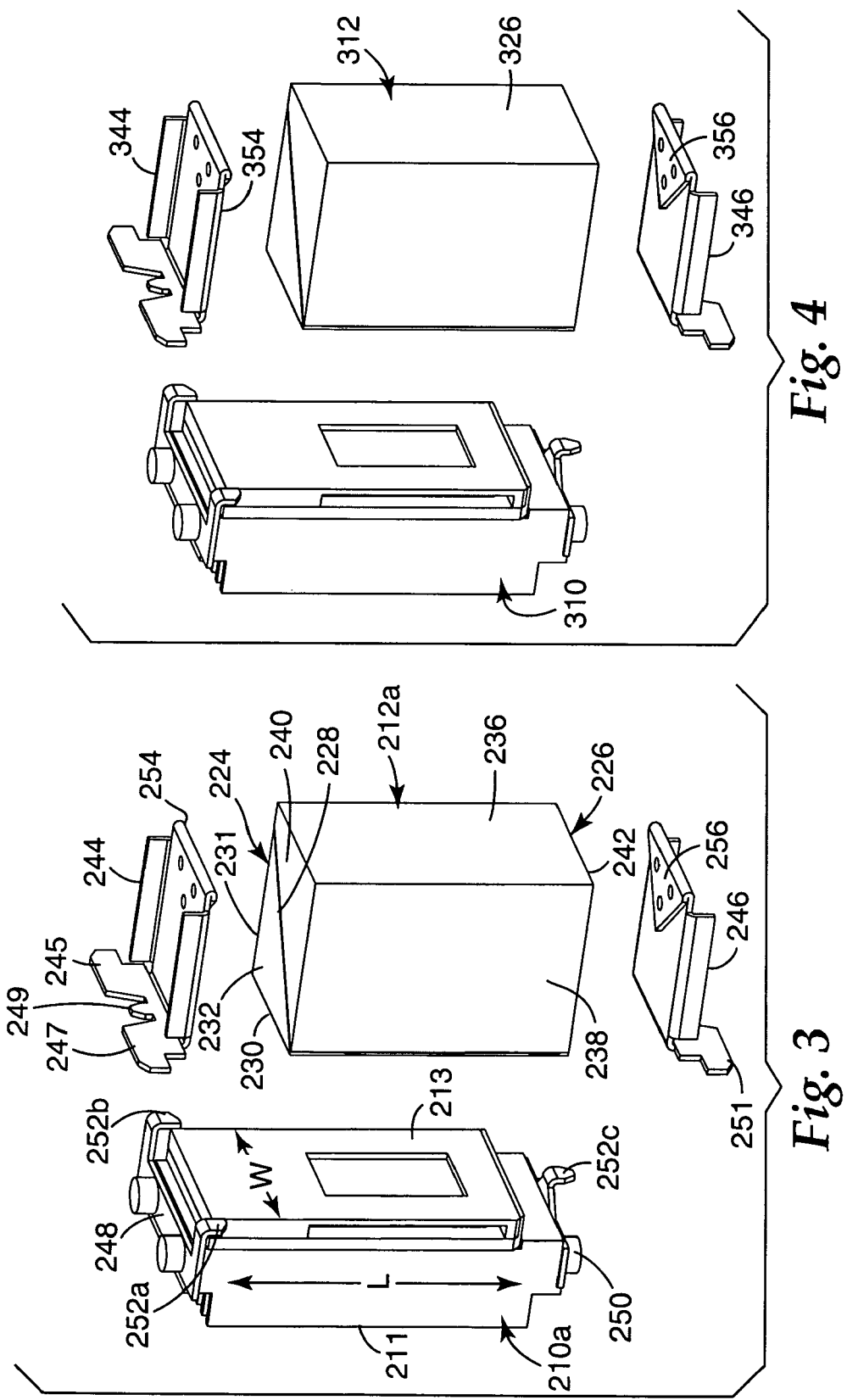

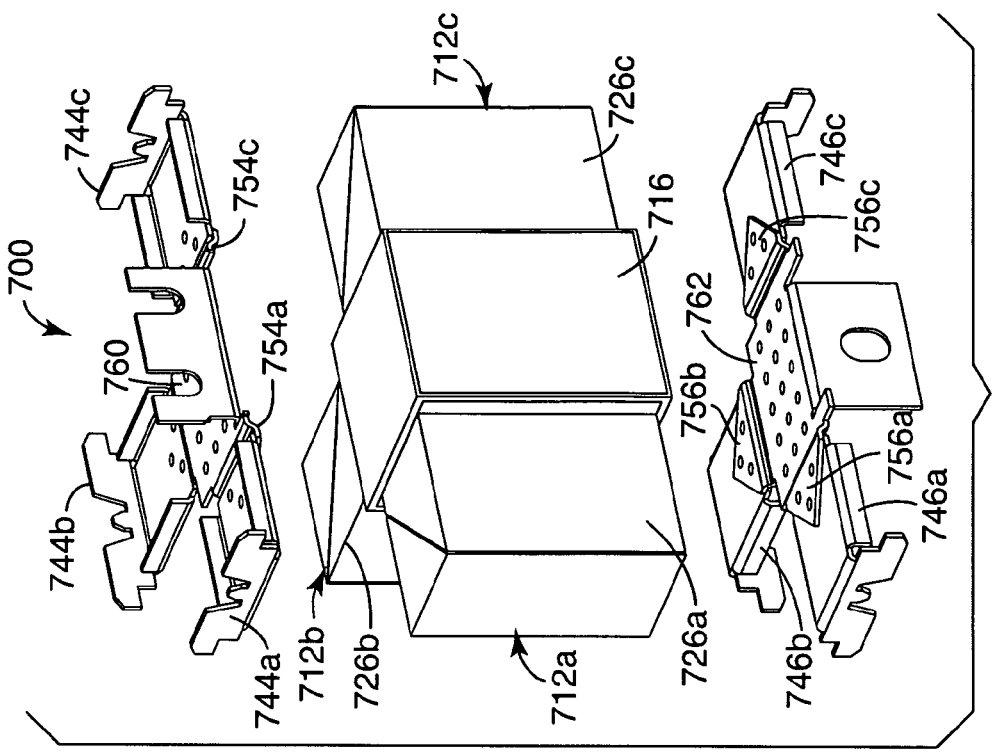
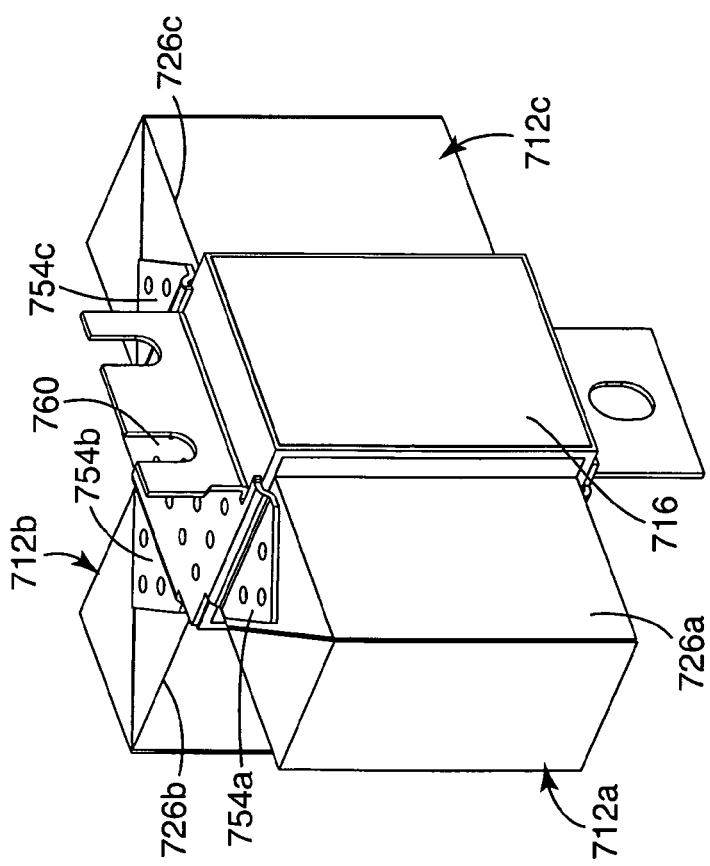

APPARATUS AND METHOD FOR MOUNTING IMAGERS ON STRESS-SENSITIVE POLARIZING BEAM SPLITTERS

FIELD OF THE INVENTION

The invention relates to optical systems and more particularly to optical systems that use polarizing beamsplitters (PBSs), and related aspects of mounting the PBS in the optical system.

BACKGROUND

The function of a polarizing beamsplitter (PBS) is to reflect light in one polarization state and to transmit light in the orthogonal polarization state. Consequently, PBSs find widespread use in optical systems that rely on the polarization of the light. An example of one such system is an image projection system that uses a reflective liquid crystal display (LCD) panel for modulating an illumination light beam: a polarized illumination light beam is directed to the LCD panel, for example by reflection in the PBS. The light beam is spatially modulated by the LCD panel so that the reflected beam contains some unmodulated light in the polarization state of the illumination beam and some modulated light in the orthogonal polarization state. The unmodulated, non-image light is reflected by the PBS and the modulated, image light, which contains the desired image, is transmitted through the PBS. Thus, the PBS separates the image light from the non-image light and the image light can then be projected to a screen for viewing by a user.

PBSs are often formed as a polarizing layer sandwiched between the hypotenuses of two right-angled, glass prisms. Exemplary polarizers used in a projection system can include, for example, MacNeille PBSs, which rely on a stack of quarter wave films of isotropic material oriented at Brewster's angle for one of the polarization states as the polarizing layer, or Cartesian multilayer optical film (MOF) PBSs, which use a stack of alternating isotropic and birefringent polymer materials as the polarizing layer.

If there is any birefringent retardation in the glass prism portion of the PBS, the effectiveness of the PBS can be reduced because, for example, the nominally s-polarized illumination light reflected from the polarizing surface is rotated, due to the birefringence of the glass prism, to being partially p-polarized. When used in a liquid crystal on silicon (LCoS) type imager, undesirable rotation of the polarization can occur both on the light path to the imager and on the light path after being reflected by the imager. Rotation of the light both entering and exiting the imager can cause undesirable light to leak through the polarizing layer thereby reducing contrast of the projection system. The reduction in contrast is due to an increase in the level of brightness in the dark state. Birefringent retardation in the glass prism may result from a number of different causes, for example, mechanical stresses induced in the PBS components while assembling the PBS, stresses induced by attachment of the PBS, or by thermal expansion in the PBS when subjected to an intense illumination light beam.

In an effort to overcome this problem, a significant amount of work was done by glass manufacturers to make glass that develops very little birefringence in response to mechanical stress. PBH56 made by Ohara Inc., having headquarters in Japan, and SF57 made by Schott AG, having headquarters in Germany, are example glasses of this typeand. Such glasses contain lead (chemical symbol Pb) in significant quantities and therefore are not environmentally desirable materials. These materials can also be expensive and difficult to process. Additionally, the low SOC glasses have a high refractive index, in excess of 1.8, which may lead to optical inefficiencies or aberrations when matching to the lower refractive index polarizing layers.

Due to increasingly strict environmental laws related to the use and disposal of lead-based materials, the use of lead in the glass portion of the PBSs is becoming less common. Without the use of lead in the PBS, the PBS can be highly sensitive to mechanical stresses that result in birefringence and other performance degrading issues.

SUMMARY OF THE INVENTION

The invention generally relates to optical systems that use optical elements such as polarizing beamsplitters (PBSs), and related aspects of mounting the PBS in the optical system. An important aspect of the invention relates to mounting of the optical element (e.g., PBS) in the optical system via the exit prism (e.g., optically less sensitive component of the PBS) rather than the input prism (e.g., optically highly sensitive component of the PBS). By isolating the input prism from mechanical connection, the occurrence of thermally and mechanically induced birefringence can be reduced.

One aspect of the invention relates to an optical device that includes an optical element, an imager, and a prism bracket. The optical element includes an optical element having first and second prisms coupled together. The imager is arranged adjacent to the first prism and configured to receive light from or to transmit light to the optical element, wherein the first prism is spaced between the second prism and the first imager. The prism bracket is coupled between the second prism and the first imager to hold the first imager in a desired positional alignment relative to the optical element. The optical device may further include additional sets of an optical element, imager, and prism bracket, wherein all of the sets are coupled to a color light combiner.

Another aspect of the invention relates to an optical device that includes a polarizing beam splitter (PBS), an imager, and at least two prism brackets. The PBS includes first and second prisms. The imager assembly includes at least two imager brackets mounted thereon and a first imager. The first imager is arranged relative to the polarizing beam splitter to receive light from the first prism, wherein a polarized light beam entering the first imager passes through the first prism along a first path and a light beam leaving the imager passes through the first prism and then the second prism along a second path. The at least two prism brackets are mounted on the second prism and coupled to separate imager brackets to hold the first imager in a desired positional alignment relative to the polarizing beam splitter.

A further aspect of the invention relates to a display system that includes an optical element, an imager, a prism bracket, and a screen. The optical element includes first and second prisms that are coupled together. The imager is arranged to receive light from the first prism, wherein the first prism is spaced between the second prism and the first imager. The prism bracket couples the second prism to the imager to hold the imager in a desired positional alignment relative to the optical element. The screen is configured and arranged to receive and display light emitted from the first imager.

A yet further aspect of the invention relates to a method of making an optical device. The method includes providing first and second prisms, a prism bracket, and an imager, and coupling the first and second prisms together. The method also includes mounting the prism bracket on the second prism, positioning the first prism between the second prism and the imager, and coupling the prism bracket to the imager to hold the imager in a desired positional alignment relative to the optical element.

Another method according to the invention relates to reducing birefringence in an optical system. The method includes providing a color light combining member, an imager, and a polarizing beam splitter, the polarizing beam splitter an optical element, the optical element including input and exit prisms, wherein the optical element comprises substantially no lead material. The method further includes positioning the input prism between the exit prism and the imager, and mounting the optical element to either the imager or the color combining member by engaging the exit prism and not the input prism.

The above summary of the present invention is not intended to describe each illustrated embodiment or every implementation of the present invention. The following figures and detailed description more particularly exemplify these embodiments.

BRIEF DESCRIPTION OF THE DRAWINGS

The invention may be more completely understood in consideration of the following detailed description of the various embodiments of the invention in connection with the accompanying drawings, in which:

FIG. 3 is an exploded perspective view of one of the PBS, imager and bracket assemblies shown in FIG. 2;

FIG. 4 is an exploded perspective view of another example assembly of a PBS, an imager, and a second bracket assembly;

FIG. 10 is a perspective view of the optical core shown in FIG. 8 with the imagers and portions of the bracket configuration removed; and FIG. 11 is an exploded perspective view of the optical core shown in FIG. 8 with the imagers removed.

Figure 1:
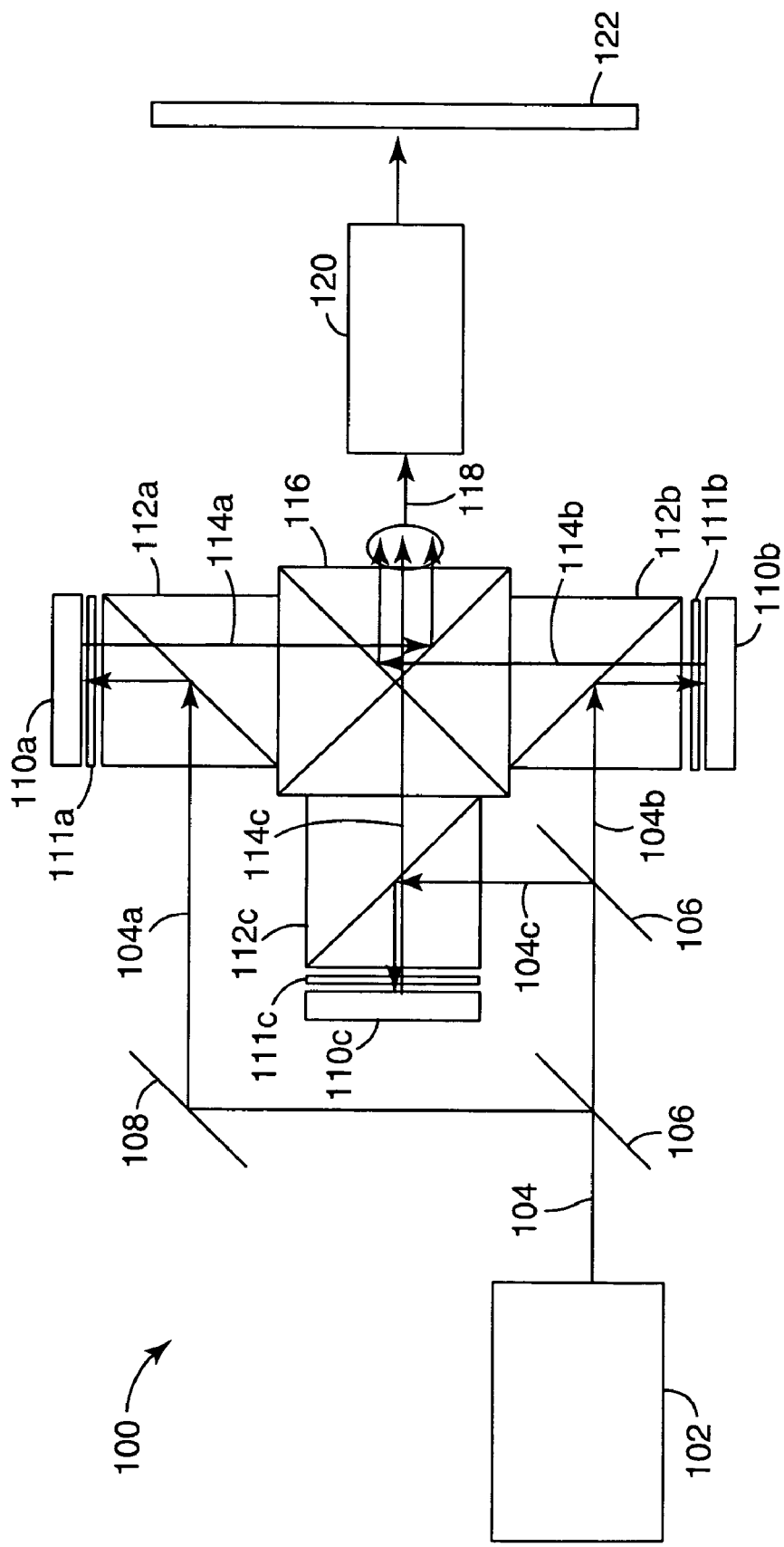
FIG. 1 is a schematic diagram illustrating an example projection unit in accordance with one aspect of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is applicable to systems that use optical devices such as polarizing beamsplitters (PBSs). The invention is believed to be particularly useful for image projection systems that incorporate PBSs for separating image light generated using a polarization modulator from illumination light. While the invention may be useful in any application where a PBS is used, it is described below particularly as used in projection systems. The scope of the invention is not intended to be limited to only projection systems. Some specific system wherein the optical devices of the invention are used include televisions, rear projection display devices, a front projection display devices, heads-up displays, head-mounted displays, and wearable displays.

A PBS is an optical component that splits incident light rays into a first polarization component (e.g., reflected component for MOF polarizers and transmitted component for wire grid polarizers) and a second polarization component (e.g., transmitted component for MOF polarizers and reflected component for wire grid polarizers). For projection systems that use reflective liquid crystal display (LCD) imagers, a folded light path where the illuminating light beam and the projected image share the same physical space between a polarizing beam splitter (PBS) and an imager offers a compact design. Reflective LCD imagers modulate the polarization of light, i.e., polarized light is either reflected with its polarization state substantially unmodified for the darkest state or reflected with its polarization state rotated to provide a desired gray scale. Thus, a polarized light beam is generally used as the input beam. Use of a PBS offers an attractive design because it can function to polarize the input beam and fold the light path.

PBSs typically include an input prism, an output prism, and an optical film positioned between the input and output prisms. A light beam passing through the PBS is susceptible to birefringence (i.e., distortion or rotation of the beam polarization) along its path through the PBS components (e.g., when passing through the input prism, when reflected off of the optical film, when reflected off of the imager, when passing through the film, and when passing through the output prism.) Birefringence can reduce contrast of an image generated from light passing through the PBS. A critical portion of the light path through the PBS is primarily contained within the input or entrance prism. Once the light beam has passed through the optical layer (i.e., as the light exits the input prism) it has been polarized and any unwanted polarization has been filtered out of the light beam. Any resulting birefringence and additional rotation of the light polarization imposed due to the output prism is not as critical to the resulting image quality and contrast. Therefore, reducing birefringence in the input prism of a PBS is of greater importance than reducing birefringence in the exit prism.

One way in which birefringence can be minimized in the input prism is to isolate the input prism as much as possible from mechanical and thermal stresses. Mechanical stresses can be imposed by physical attachment or mounting of an object to another structure or object. Thermal stresses commonly occur at the interface of two objects when the materials of those objects have a mismatch of thermal expansion coefficients. Some materials (e.g., leaded glasses) are less susceptible to thermal and mechanical stress induced birefringence and therefore can help minimize birefringence in the input prism. The use of these materials in the PBS make it possible to attach the imaging device to the PBS with attachment brackets having minimized length, as discussed in U.S. Pat. No. 6,709,110. The configurations disclosed in U.S. Pat. No. 6,709,110 suggest connection of the mounting brackets between the input prism and to the imager thereby providing the shortest bracket length possible. A shorter bracket length can help improve stability of the imager by minimizing the effects of thermal expansion or contraction of the mounting brackets and the PBS.

Considerations such as cost, availability, and environmental concerns make the use of lead-free glasses advantageous as compared to using leaded glasses in a PBS. When using lead-free glasses in the PBS, isolation of the input prism from mechanical and thermal induced birefringence can be improved by mounting the PBS in the optical system with mounting brackets that connect to the output prism of the PBS rather than to the input prism. While such a mounting arrangement may result in some mechanical and thermal stress induced birefringence in the exit prism, it is more critical to the overall PBS performance that the input prism has been isolated from that birefringence.

The invention may be used in many different types of projection systems. One exemplary embodiment of a multi-panel projection system 100 that may incorporate the invention described below is schematically illustrated in FIG. 1. The projection system 100 is a three-panel projection system, having a light source 102 that generates a light beam 104, containing light in three different color bands. The light beam 104 is split by color splitting elements 106, for example dichroic mirrors, into first, second and third beams 104a, 104b, 104c containing light of different colors. The beams 104a, 104b, 104c may be, for example, red, blue and green in color, respectively. Beam steering elements 108, for example mirrors or prisms, may be used to steer any of the beams 104, 104a, 104b, or 104c.

The beams 104a, 104b, 104c are directed to respective image forming devices 110a, 110b, 110c which may be, for example, LCD-based reflective image-forming panels, such as liquid crystal on silicon (LCOS) panels. The light beams 104a, 104b, 104c are coupled to and from the respective image-forming devices 110a, 110b, 110c via respective polarizing beamsplitters (PBSs) 112a, 112b, 112c. The image-forming devices 110a, 110b, 110c polarization modulate the incident light beams 104a, 104b, 104c so that the respective image beams 114a, 114b, 114c are separated by the PBSs 112a, 112b, 112c and pass to the color combiner unit 116. In the illustrated exemplary embodiment, the illumination light beams 104a, 104b, 104c are reflected by the PBSs 112a, 112b, 112c to the image-forming devices 110a, 110b, 110c and the resulting image light beams 114a, 114b, 114c are transmitted through the PBSs 112a, 112b, 112c. In another approach, not illustrated, the illumination light may be transmitted through the PBSs to the image-forming devices, while the image light is reflected by the PBSs.

Additional optical members may be positioned between the PBSs 112a, 112b, 112c and the image-forming devices 110a, 110b, 110c. In one example (see FIG. 1), quarter-wave retardation elements 111a, 111b, 111c are positioned between the image-forming devices 110a, 110b, 110c and respective PBSs 112a, 112b, 112c. The quarter-wave retardation elements 111a, 111b, 111c may be used to compensate for residual birefringence in the image forming devices 110a, 110b, 110c and for compensating birefringence in the PBSs 112a, 112b, 112c. Further advantages and functions of quarter-wave retardation elements are described in U.S. patent application Ser. No. 11/088,153 filed on Mar. 23, 2005, and entitled STRESS BIREFRINGENCE COMPENSATION IN POLARIZING BEAMSPLITTERS AND SYSTEMS USING SAME, which application is incorporated herein by reference.

The color combiner unit 116 shown in FIG. 1 combines image light beams 114a, 114b, 114c of different colors, for example using one or more dichroic elements. The color combiner unit 116 is an x-cube color combiner. The three image beams 114a, 114b, 114c are combined in the color combiner unit 116 to produce a single, colored image beam 118 that may be directed by a projection lens system 120 onto a screen 122.

Other projection system embodiments may use one, two, or more than three PBSs. For example, a projection system may use one or two image-forming devices, with respective PBSs, as is described in greater detail in U.S. Published Patent Applications No. 2004/0227898-A1 filed on May 16, 2003, and entitled HIGHLY EFFICIENT SINGLE PANEL AND TWO PANEL PROJECTION ENGINES, and U.S. patent application Ser. No. 10/914,596 filed on Aug. 9, 2004, and entitled PROJECTION DISPLAY SYSTEM USING MULTIPLE LIGHT SOURCES AND POLARIZING ELEMENT FOR USING WITH SAME, which applications are incorporated herein by reference. Different types of light sources may be used, including white light sources, such as high-pressure mercury lamps, and colored light sources, such as light emitting diodes. The intention of the present disclosure is not to limit how the illumination light reaching the PBS is generated, or how the light is processed before reaching the PBS.

High quality polarizing beamsplitters (PBSs) for providing high contrast images in projection systems have previously required the use of glass material having a low stress optic coefficient (SOC), also known as photoelastic constant. Examples of low SOC glasses include PBH56 and SF57 glasses. These glasses have high lead content, for example 70% weight lead oxide or more, and a high refractive index, in excess of 1.8. The use of high quantities of lead in the PBS glass leads to environmental concerns. In addition, since the polarizing layers in a multilayer optical film polarizer have a refractive index typically in the range of about 1.5-1.6, the refractive index difference between the polarizing layers and the glass is high, which may lead to a sub-optimal angle of incidence on the polarizing layer when the low SOC glass is used. This relatively large refractive index difference may lead to aberrations which can be addressed in the optical design of the system or the PBS itself, for example as discussed in U.S. Pat. Nos. 6,672,721 and 6,786,604. Also, the low SOC glasses have a low Abbe number, which means that the dispersion is high, so SOC glasses may be less suitable for applications covering a wide range of wavelengths.

The elimination of lead from products is an important environmental objective, and one that affects the performance of birefringence sensitive optical systems. The present invention is directed to the use of standard glasses, for example N-BK7, N-SK5, and the like, available from Schott North America, Duryea, Pa., or equivalent glasses. For example, S-BAL35 and ZK3 are roughly equivalent to NSK5, and are respectively supplied by Ohara Incorporated, Japan and Chengdu Guangming, China, respectively. Although these glasses have high values of SOC, for example up to more than one hundred times that of the low SOC glasses listed above, they may be used according to the present invention in PBS applications that maintain high contrast, even when subject to the stresses experienced in illuminating an imaging core for projection televisions. These standard glasses do not contain lead.

Many unsuccessful attempts have been made to use lead-free glass in imaging PBS applications. For example, Cline et al. (Thermal stress birefringence in LCOS projection displays, Display 23 (2002) pp. 151-159) analyzed and tested a number of glasses for illumination-induced thermal stress birefringence, i.e. the stress birefringence that arises due to absorptive heating of the glass when illuminated by illumination light. The analysis produced a figure of merit for illumination-induced thermal stress birefringence, which suggested that the illumination-induced thermal stress birefringence of SK5, BK7 and Ultran 30 might be sufficiently low for use in projection television systems. Cline et al. noted, however, that their analysis did not take into account other sources of stress birefringence, including mechanical stresses arising from assembly and mounting, and thermal stresses arising for reasons other than illumination, for example cooling fans, heat from electronics or heat absorbed and radiated by the reflective imager.

Some additional stress birefringence may arise, for example, due to different thermal expansion coefficients among the adhesive and the glass cover. These additional sources of mechanical stress induce stress birefringence, over and above the illumination-induced thermal birefringence discussed by Cline, resulting in these non-leaded glasses being unsuited for simply replacing leaded glasses in a PBS used in a projection system. Experimental results are provided below that show that the contrast of a PBS can be significantly compromised when using N-SK5 glass.

The embodiments of the invention are useful for reducing mechanically and thermally induced birefringence in a PBS component. The invention may be effective for the various types of PBSs, such as Cartesian Multilayer Optical Film (MOF) PBSs and MacNeille PBSs, with a glass element between the polarizing layer and the image-forming device. The invention may also be effective for other types of PBSs, and may be less relevant for some types of PBSs such as wire grid PBSs that have no glass element between the polarizing wire grid layer and the image-forming device.

Figure 2:
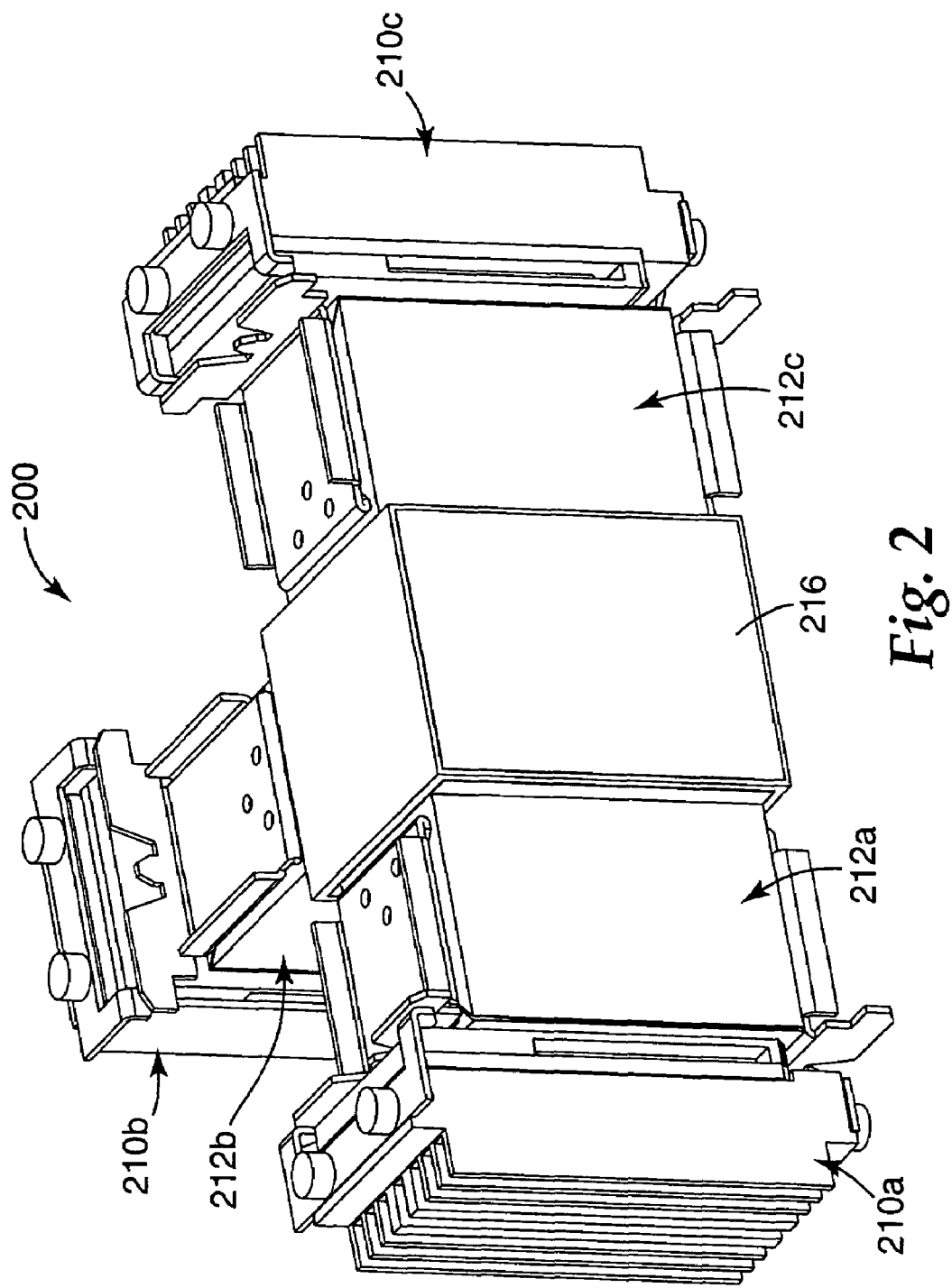
FIG. 2 is a front perspective view of an example optical core including a color light combiner and three assemblies of a PBS, an imager, and a first bracket configuration according to the invention.

Referring now to FIG. 2, an example imaging unit 200 illustrating features of the invention is shown. Imaging unit 200 includes image forming assemblies or imager assemblies 210a, 210b and 210c, and PBSs or optical elements 212a, 212b, 212c that surround a color combiner unit 216. FIG. 3 illustrates a representative imager assembly 210a, PBS 212a, and a bracket assembly shown in partially exploded perspective view.

The PBS 212a includes first and second prisms 224, 226 that are commonly known as input and output prisms, respectively. A polarizing or other intermediate optical layer 228 (see FIG. 3) may be positioned at the interface between the prisms 224, 226. The first prism 224 is positioned adjacent to and facing the imager assembly 210a between the second prism 226 and the imager assembly 210a. The second prism 226 is positioned adjacent to and facing the color combiner unit 216 (see FIG. 2). In this embodiment, light beams exiting the imager assembly 210a pass first through the first prism 224 and then through the second prism 226 before entering the color combiner 216.

The first prism 224 includes first and second input sides 230, 231, a top side 232, and a bottom side (not shown). The second prism 226 includes an output side 236, an optically unused side 238, a top side 240, a bottom side 242. Typically the top and bottom sides of the first and second prisms as well as the optically unused side 238 of the second prism are arranged outside of an intended light path such that no light passes through those surfaces. Thus, it is advantageous to mount to the PBS 212 at those surfaces.

The bracket assembly includes first and second prism brackets 244, 246, and first and second imager brackets 248, 250. The imager brackets 248, 250 are secured directly to the imager assembly 210a and provide three or more (preferably at least three) mounting points 252a, 252b, 252c for coupling to the prism brackets 244, 246. The brackets 248, 250 may be secured directly to a heat sink portion 211 (shown in FIG. 3) or to an imager portion 213 of the imager assembly 210a.

In one embodiment, the first imager bracket 248 includes two mounting points 252a, 252b that are spaced apart from each other across a width dimension W (where the width dimension is defined as the smaller of the width and length dimensions of the imager) of the imager assembly 210a in FIG. 3. These two mounting points 252a, 252b can then be coupled to a single prism bracket 244. The second imager bracket 250 is spaced apart from the first imager bracket 248 along the length dimension L of the imager assembly 210a. The second imager bracket 250 includes a single mounting point 252c that can be coupled to the second prism bracket 246. This arrangement can provide stability of the positioning of the imager assembly 210a while reducing the effects along the longest dimension of the different thermal expansion coefficients of the prism brackets 244, 246 and the PBS 212a. In other embodiments, the prism brackets and imager brackets may include different configurations with different numbers of mounting points therebetween.

The prism brackets 244, 246 are adhesively or otherwise secured to the prism 226 of the PBS 212a. The prism brackets 244, 246 are preferably, but not necessarily, similarly shaped as illustrated in FIG. 3, with respective structures 245, 247, 249 for coupling to the mounting points 252a, 252b, and a structure 251 (and other features not clearly shown in FIG. 3) for coupling to the mounting point 252c. While only one or two of the structures 245, 247, 249 may be used on each of the prism brackets 244, 246, there may be configurations in which all three are used for mounting to a respective imager bracket. This preferred arrangement can reduce the complexity of the assembly of the imaging unit 200 and may provide for the use of the same part at multiple locations in the imaging unit assembly.

It is important to note that thermal and mechanical stresses can be induced in the prisms 224, 226 at the connection point of the prism brackets 244, 246 to the prism 226. Various stresses may arise at the interface between the mounting material/structure (e.g., adhesive, welding, or solder) and the brackets and at the interface between the mounting material/structure and the prism 226. The amount and type of stresses induced in the prisms 224, 226 can be influenced by, for example, the point of attachment and the surface area defining the point of contact between the brackets and the prism and any intervening mounting material/structure.

The imager brackets 248, 250 can be mounted to the imager assembly 210a, for example, to a heat sink portion 211 of the imager assembly 210a, using any mounting technique. Some example mounting techniques include adhesives, fasteners (e.g., screws, bolts, etc.) welding, or soldering. The imager brackets 248, 250 may be coupled to the prism brackets 244, 246 using similar mounting techniques. In one embodiment, the imager brackets 248, 250 and prism brackets 244, 246 are soldered together to facilitate mounting or readjustment necessary for aligning the imager assembly 210.

The prism brackets 244, 246 include a contact pad 254, 256, respectively. The contact pads may have similar sizes such that the prism brackets 244, 246 can be interchangeable, or may have different sizes unique to supporting a specific portion of the PBS 212a. The contact pads 254, 256 may have a customized shape for a given PBS configuration that helps to optimize a balance between mechanical and thermal stresses caused by attachment of the prism brackets 244, 246 to the PBS. The larger the surface area of the contact pads 254, 256 the greater the spreading of mechanical stress, which may reduces the stress concentration in PBS 212a. Larger surface area will also provide a stronger adhesive bond and minimize creep of the bracket. However, the greater the surface area of the pad, the more likely that mismatch of the thermal expansion coefficients of the contact pads 254, 256, PBS 212a and mounting material (e.g., adhesive, solder, welding, fasteners) positioned between the pads and the PBS will result in higher induced thermal stress. The converse is true in that the smaller the surface area of the contact pads, the more concentrated is the mechanical stress and the weaker the bond between the brackets and the PBS while the effects of thermal mismatch are reduced.

The material used between the contact pads 254, 256 and the PBS 212a to secure those parts together must be compliant enough to minimize the buildup of potentially damaging stress particularly when exposed to rapid temperature changes (thermal shock), but also be rigid enough to avoid creep so as to maintain the imager in proper alignment for the lifetime of the optical device.

The prism brackets 244, 246 have a length (the dimension measured between the imager assembly 210a and PBS 212a) that is long enough to position the contact pads 254, 256 over respective top and bottom sides of the second prism 226. The shape of the contact pads 254, 256 isolates contact between the brackets 244, 246 and the PBS 212a to the second prism 226 only. As a result, the PBS 212a is mounted to the imager assembly 210a (or visa versa) with contact only between the second prism 226 and the imager assembly 210a and not between the first prism 224 and the imager assembly 210a.

A critical portion of a light path through the PBS 212a is primarily contained within the first prism 224 and the optical layer 228. Once a light beam has passed through the first prism 224 and the optical layer 228 for the last time, it has been polarized and any unwanted polarization has been filtered out of the light beam. Any resulting birefringence and additional rotation of the light polarization imposed on the light beam due to the second prism 226 is not as critical to the resulting image quality and contrast because the light has already been polarized. The first prism 224 is sometimes characterized as being more optically sensitive than the second prism 226 in that the mechanical and thermal stress induced birefringence in the first prism 224 has a greater effect on the PBS performance than does creation of similar birefringence in the second prism 226.

Connecting the first and second prism brackets 244, 246 to the second prism 226 rather than to the first prism 224 can help isolate the first prism 224 from mechanical and thermal induced birefringence. This connection configuration can also provide a reduced bracket length for mounting of the imager assembly 210a in the imaging unit 200, thereby improving stability and performance of the imager.

FIGS. 2 and 3 illustrate example mounting configurations for mounting of an imager to a PBS without contacting the input or first prism of the PBS. FIGS. 4-11 illustrate additional embodiments in which the prism brackets include, for example, contact pads having different configurations, the prism brackets engaging different sides of the second prism, or the PBS mounted to the color combiner unit in addition to the imager.

Referring to FIG. 4, an imager 310 is mounted to a PBS 312 with first and second prism brackets 344, 346 having contact pads 354, 356. The contact pads 354, 356 are sized with a contact area that substantially matches the total exposed top or bottom surface of the second prism 326. As discussed above, such a configuration with maximized surface contact area may optimize reduction of mechanical stresses, provide a stronger adhesive bond and minimize likelihood of creep. However, depending on the materials used to secure the prism brackets 344, 346 to the second prism 326 (e.g., adhesives, welding, soldering, etc.), such a configuration for the pads 354, 356 may result in higher thermal stresses due to thermal mismatches.

Figure 5:
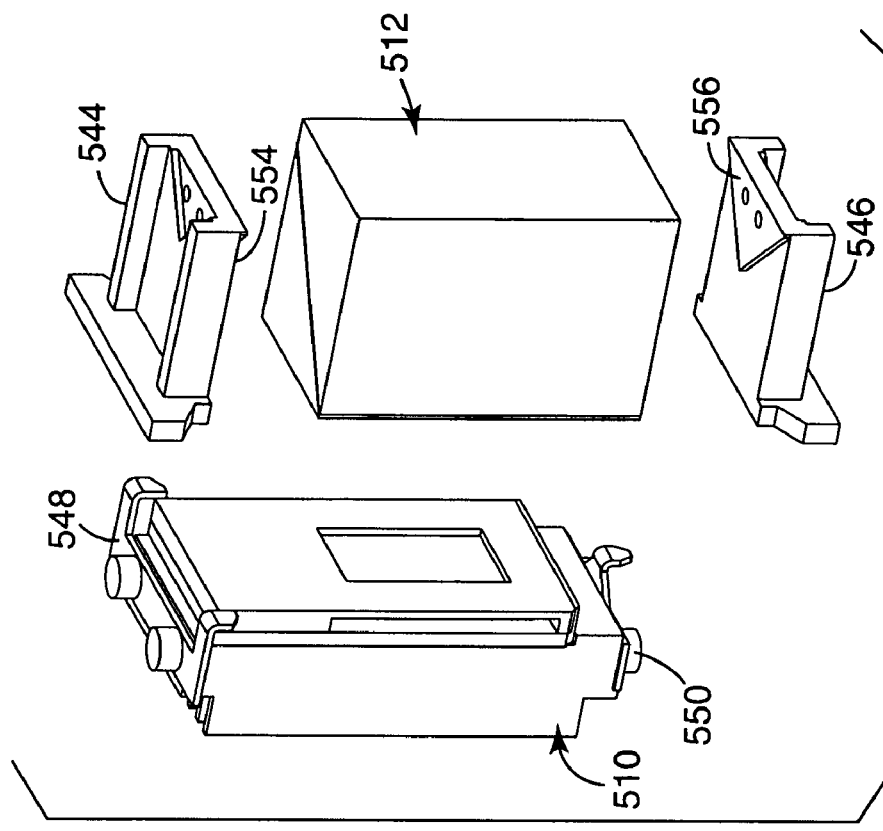
FIG. 5 is an exploded perspective view of another example assembly of a PBS, an imager, and a third bracket assembly.

FIG. 5 illustrates an imager 410, a PBS 412, and a bracket assembly that includes first, second and third prism brackets 444, 445, 446, and first and second imager brackets 448, 450. The first and second prism brackets 444, 445 each include separate contact pads 454, 455 for engagement on a top surface 440 of a second prism 426 of the PBS 412. The third bracket prism 446 includes a contact pad 456. The pads 454, 455, 456 have a reduced width as compared to those brackets described in FIGS. 3 and 4 above. Also, the size of the contact pads 454, 455, 456 is minimized due to their width substantially matching the width of the prism bracket. The contact pads 454, 455, 456 also have a length customized to, for example, maximize contact area along that portion to the second prism 426 permitted without extending onto the first prism 424. The configuration of FIG. 5 illustrates just one example of how the various prism brackets can be modified in shape and size and the corresponding contact pads can be configured to match or otherwise be optimized in view of the specific shape of the prism brackets.

Figure 6:
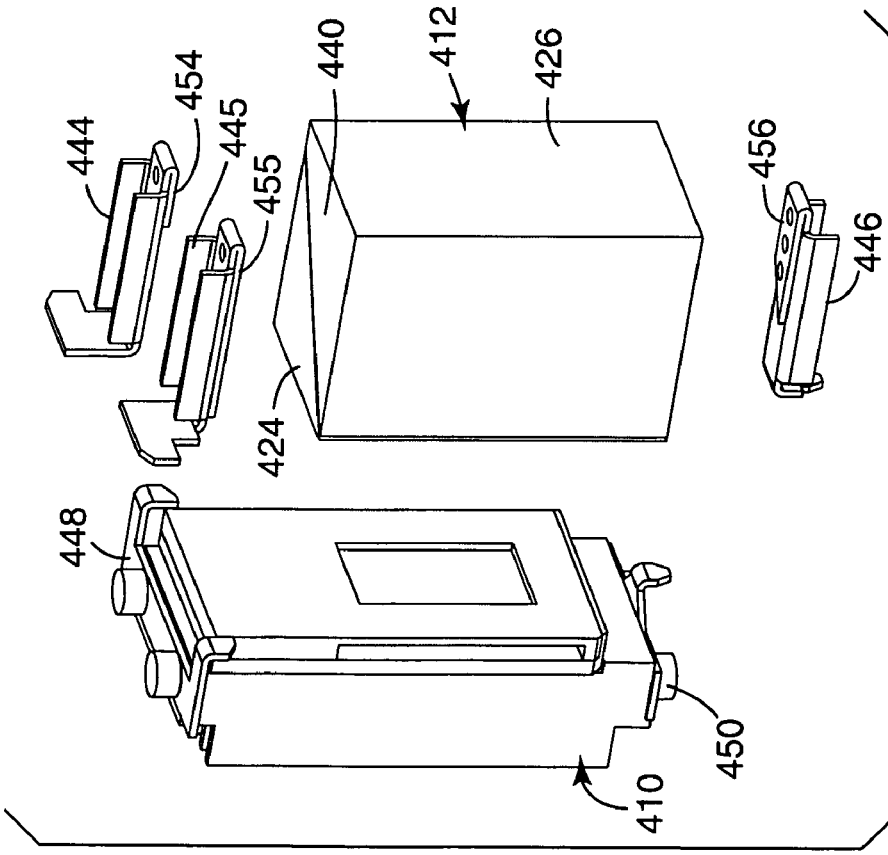
FIG. 6 is an exploded perspective view of another example assembly of a PBS, an imager, and a fourth bracket assembly.

Referring now to FIG. 6, an imager 510 can be coupled to a PBS 512 with a bracket assembly that includes first and second prism brackets 544, 546 and first and second imager brackets 548, 550. The prism brackets 544, 546 are molded members formed by, for example, injection molding of polymer-based materials. The use of moldable material such as polymers for the prism brackets 544, 546 may provide several advantages. One such advantage relates to the lower costs involved in high-volume production of the polymer brackets. Another advantage relates to higher thermal expansion coefficients available for many polymers as compared to steel and even aluminum. For example, glass-filled polymers can reduce thermal expansion coefficients of the polymer material to an acceptable level for a given application thereby providing a closer thermal match of materials between the brackets 544, 546 and the PBS 512. Using molded pieces may also permit the use of complex shapes for the brackets 544, 546 that would be difficult to manufacture if using metal materials. Similar molded pieces may be used for the imager brackets 548, 550.

The contact pads 554, 556 may be made of the same moldable materials as the rest of the prism brackets 554, 556. In some embodiments, the contact pads 554, 556 may be made of different material (e.g., metallic or glass material) to provide a closer match of thermal expansion coefficients with that of the glass prism or to optimize bonding of the brackets to the glass prism (e.g., bonding with an adhesive). The different material may be comolded or otherwise embedded within the brackets 554, 556.

The molded pieces shown in FIG. 6 may include a composite material such as, for example, 20% glass filled Ultem 2210 (GE Plastics) or glass filled LCP (Liquid Crystal Polymer).

Figure 8:
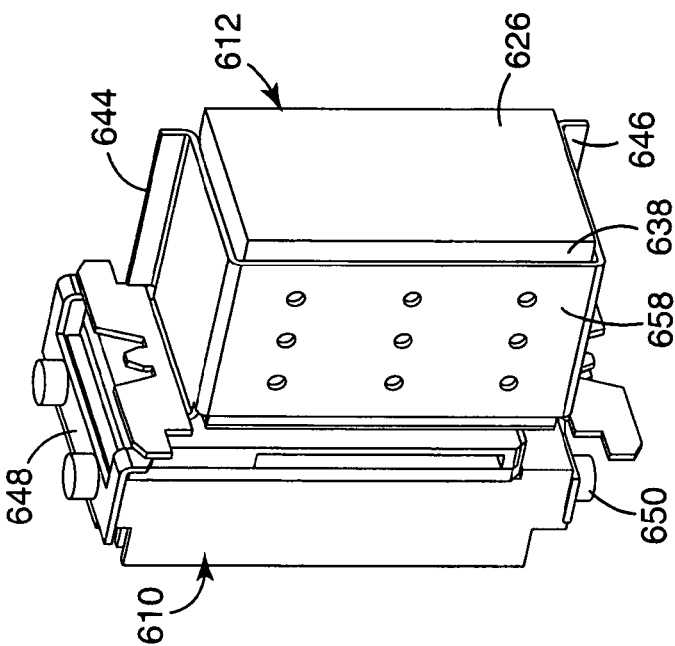
FIG. 8 is a perspective view of the assembly shown in FIG. 7.
Figure 7:
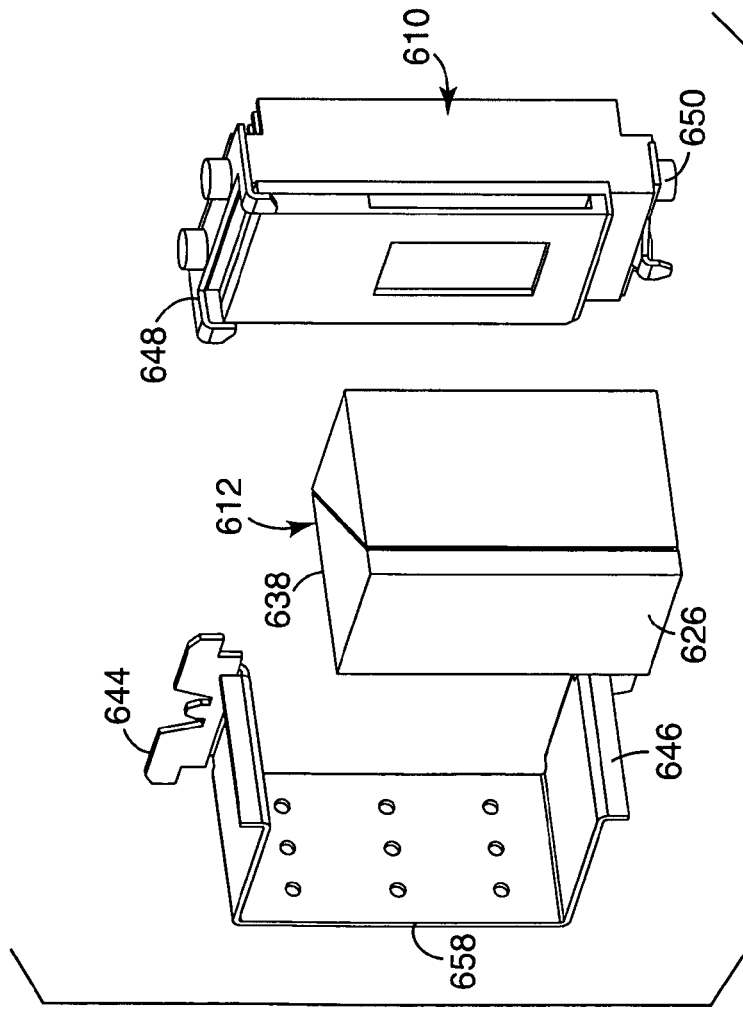
FIG. 7 is an exploded perspective view of another example assembly of a PBS, an imager, and a fifth bracket assembly.

Referring now to FIGS. 7 and 8, an imager 610 can be mounted to a PBS 612 with a bracket assembly that includes first and second prism brackets 644, 646 coupled together with a connecting arm 658, and first and second imager brackets 648, 650. In one embodiment, the brackets 644, 646 and connecting arm 658 are integrally formed as a single piece. Such an integral bracket has certain advantages related to manufacturability and assembly. In another embodiment, the brackets 644, 646 and connecting arm 658 are formed as two or more pieces that are separately coupled together with, for example, adhesives, welding, or soldering. In any embodiment, the brackets 644, 646 and connecting arm 658 provide several mounting surfaces that may not be available in the other embodiments disclosed herein. The connecting arm 658 is configured to couple the first and second prism brackets 644, 646 together, and is further configured as a mounting pad for mounting the PBS 612 to an optically unused side 638 of a second or exit prism 626 of the PBS 612.

As shown in FIG. 8, the first and second prism brackets 644, 646 are secured to the first and second imager bracket 648, 650. The PBS 612 is secured to the connecting arm 658 along the optically unused side 638. The optically unused side 638 preferably includes some type of nonreflective coating such that any stray light beams will not pass through the side 638 and be reflected back into the PBS 612 by the connecting arm 658. The PBS 612 may be secured to the connecting arm 658 using, for example, adhesives, welding, soldering, etc.

In some embodiments, a connecting arm 658 may include several distinct contact pads (e.g., those contact pads shown in FIGS. 3-6) having specific shapes and sizes that optimize reduction of mechanical and thermal stresses in the PBS 612.

Figure 9:
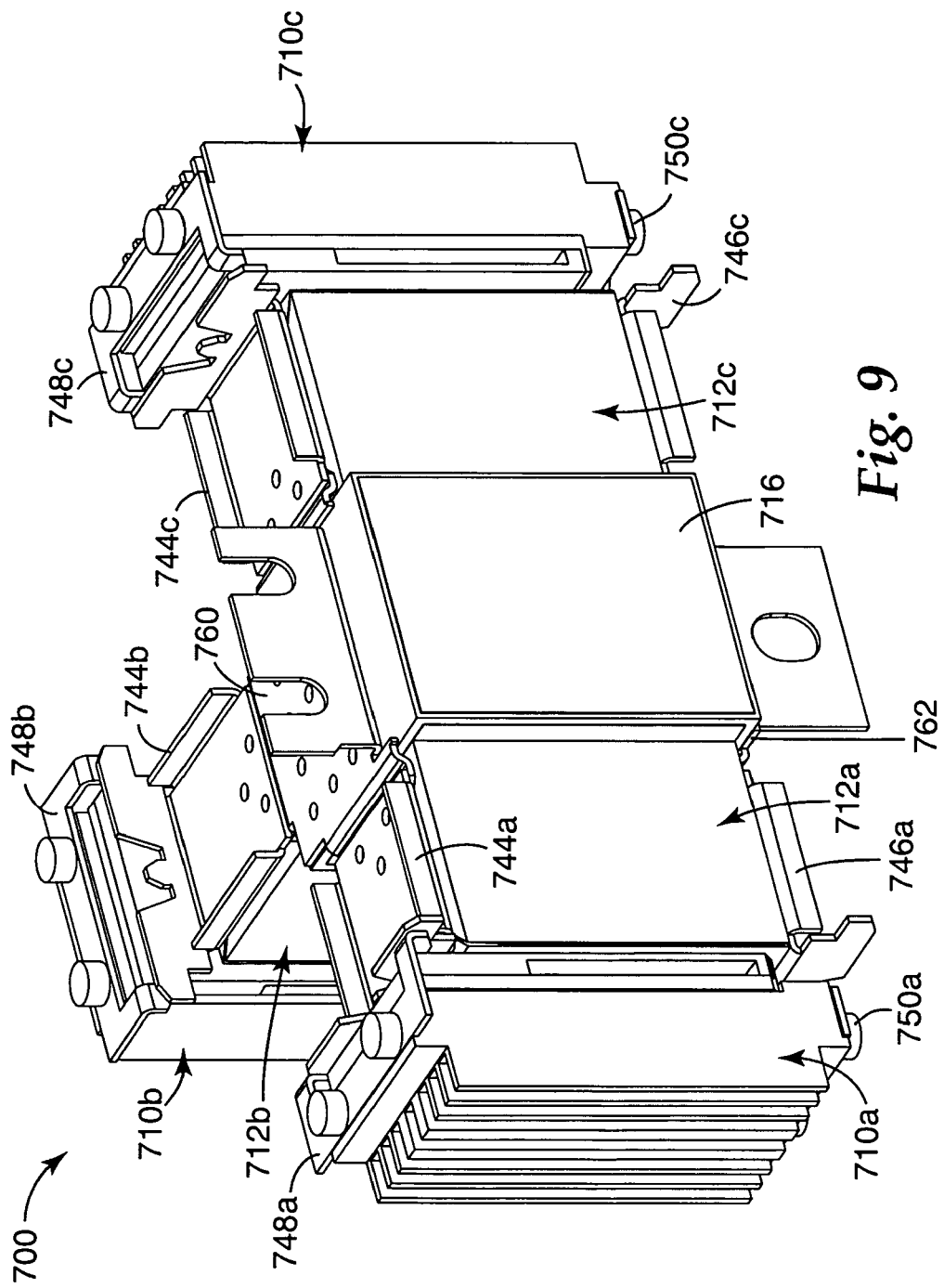
FIG. 9 is a perspective view of another example optical core including a color light combiner, a sixth bracket configuration, and three assemblies of a PBS and an imager according to the invention.

Referring now to FIGS. 9-11, another example imaging unit 700 includes imagers 710a, 710b, 710c, PBSs 712a, 712b, 712c, and a color combiner unit 716. FIGS. 10 and 11 illustrate the imaging unit 700 with some features removed or shown in exploded view to improve view of otherwise concealed features. First and second color combiner brackets 760, 762 engage top and bottom sides of the color combiner unit 716. The imaging unit 700 also includes bracket arms 744a, 744b, 744c and 746a, 746b, 746c (see FIG. 11) that extend from contact pads 754a, 754b, 754c and 756a, 756b, 756c (see FIG. 11) of the color combiner brackets 760, 762 to the imager assemblies 710a-c. The pads 754a-c and 756a-c are configured to engage respective top and bottom surfaces of the second or exit prisms 726a, 726b, 726c (see FIGS. 10 and 11) of the PBSs 712a, 712b, 712c. The color combiner brackets 760, 762 provide mounting of the PBSs with bracket arms having a minimized length (e.g., the length of the contact pads 754a-c, 756a-c) that helps reduce drifting of the PBS 712a-c out of toleranced position relative to the color combiner unit 716.

In some optical assemblies it may be desirable to have an air gap between the PBSs and the color combiner. The brackets illustrated in FIGS. 9-11 allow the PBSs to be held slightly apart from the color combiner, unlike the assembly shown in FIG. 2 where the PBSs are bonded directly to the color combiner. The brackets shown in FIGS. 9-11 may tend to hold the PBSs more securely even if the PBSs are also bonded directly to the color combiner. The concept shown in FIGS. 9-11 may require more brackets (more parts) and may have a higher potential for thermal mismatch between the glass and the brackets that can cause the PBS positions to drift more with respect to the color combiner.

The imaging unit 700 also includes first prism brackets 744a-c, second prism brackets 746a-c, first imager brackets 748a-c, and second imager brackets 750a-c that couple the imagers 710a-c to the color combiner brackets 760, 762. The prism brackets can be integral with the color combiner brackets (combined into a single part for the top and bottom brackets) or, as described, the prism brackets could be separate from the color combiner brackets. The first and second prism brackets 744a-c, 746a-c and first and second imager brackets 748a-c, 750a-c along with the configuration of the contact pads 754a-c, 756a-c and the color combiner brackets 760, 762 provide for mounting of the imagers 710a-c and PBSs 712a-c without contacting the optically sensitive first prism of the PBSs 712a-c. As discussed above, mounting of the PBSs via the first or input prism would result in unacceptable amounts of mechanical or thermal stress induced birefringence in the PBSs when lead free glass is used in the PBS prisms. Thus, the example imaging unit 700 provides a further configuration for mounting of the PBSs via the second or output prisms, thereby reducing the effects of mechanical and thermal stress induced birefringence in the PBSs.

The above specification, examples and data provide a complete description of the manufacture and use of the invention. Since many embodiments of the invention can be made without departing from the spirit and scope of the invention, the invention resides in the claims hereinafter appended.

We claim:

1. An optical device, comprising:
   an optical element including first and second prisms coupled together;
   a first imager arranged adjacent to the first prism and configured to receive light from or to send light to the first prism of the optical element, the first prism being spaced between the second prism and the first imager; and
   a first prism bracket coupled between the second prism and the first imager to hold the first imager in a desired positional alignment relative to the optical element;
   wherein the first prism bracket includes first and second members that each engage the second prism and the first imager at different locations and do not engage the first prism.

2. The optical device of claim 1, wherein the optical element comprises a first polarizing beam splitter.

3. The optical device of claim 2, further comprising:
   a second polarizing beam splitter comprising third and fourth prisms coupled together;
   a second imager arranged adjacent to the third prism and configured to receive light from the second polarizing beam splitter, wherein the third prism is spaced between the fourth prism and the second imager; and
   a prism bracket coupled between the fourth prism and the second imager to hold the second imager in a desired positional alignment relative to the second polarizing beam splitter.

4. The optical device of claim 3, further comprising:
   a third polarizing beam splitter comprising fifth and sixth prisms coupled together;
   a third imager configured to receive light from the third polarizing beam splitter and arranged adjacent to the fifth prism, wherein the fifth prism is spaced between the sixth prism and the third imager; and
   a prism bracket coupled between the sixth prism and the third imager to hold the third imager in a desired positional alignment relative to the third polarizing beam splitter.

5. The optical device of claim 4, wherein the first, second, and third polarizing beam splitters are oriented adjacent to different sides of a color light combiner and configured as a Liquid Crystal on Silicon (LCOS) core.

6. The optical device of claim 1, wherein the optical element includes a polarizing film positioned between the first and second prisms.

7. The optical device of claim 6, wherein the polarizing layer comprises a multilayer polymer polarizing film.

8. The optical device of claim 1, further comprising a second prism bracket coupled between the second prism and the first imager and spaced apart from the first prism bracket.

9. The optical device of claim 8, further comprising first and second imager brackets coupled between respective first and second prism brackets and the first imager.

10. The optical device of claim 1, wherein the first prism bracket is coupled to the second prism with an adhesive.

11. The optical device of claim 1, further comprising an imager bracket coupled between the first prism bracket and the first imager, the imager bracket engaging the first imager and not the first prism.

12. The optical device of claim 1, wherein the first imager is selected from a group consisting of a High Temperature Poly Silicon (HTPS) imager, a transmissive liquid crystal display (LCD), and a liquid Crystal on Silicon (LCOS) imager.

13. The optical device of claim 1, wherein the optical element provides polarized light to the first imager.

14. The optical device of claim 1, wherein the first and second prism comprise substantially no lead (Pb) material.

15. method of reducing birefringence in an optical system, the method comprising:
 providing a color light combining member and a polarizing beam splitter assembly, the polarizing beam splitter assembly including an imager and an optical element, the optical element including input and exit prisms, wherein the input prism comprises substantially no lead (Pb) material;
 positioning the input prism between the exit prism and the imager; and
 mounting the optical element to either the imager or the color combining member by engaging the exit prism and not the input prism.

16. A display system, comprising:
 a light source;
 a lens;
 an imager;
 a polarizing beam splitter (PBS) including first and second prisms, the first prism being arranged between the imager and the second prism;
 a polarizing layer; and
 imager control electronics;
 wherein the polarizing beam splitter is mounted in the system by connection to the second prisim, and further comprising a mounting bracket configured to couple the imager to the PBS, the mounting bracket being connected to the second prism and not to the first prism.

* * * * *

UNITED STATES PATENT AND TRADEMARK OFFICE
CERTIFICATE OF CORRECTION

PATENT NO. : 7,387,391 B2 Page 1 of 1
APPLICATION NO. : 11/133764
DATED : June 17, 2008
INVENTOR(S) : Michael K. Domroese It is certified that error appears in the above-identified patent and that said Letters Patent is hereby corrected as shown below:

Page 2, Column 1
Line 1, delete "2004-310823" and insert -- 2000-310823 --, therefor.

Column 13
Line 14, in Claim 15, before "method" insert -- A --.

Column 14
Line 16, in Claim 16, delete "prisim," and insert -- prism, --, therefor.

Signed and Sealed this

Twenty-first Day of October, 2008

JON W. DUDAS
*Director of the United States Patent and Trademark Office*